(12) United States Patent
Cornfield

(10) Patent No.: US 7,252,255 B2
(45) Date of Patent: Aug. 7, 2007

(54) FOOD PREPARATION IMPLEMENT

(76) Inventor: Randall Cornfield, 5516 Ashdale, Montreal, Que (CA) H4W 3G4

( * ) Notice: Subject to any disclaimer, the term of this patent is extended or adjusted under 35 U.S.C. 154(b) by 0 days.

(21) Appl. No.: 10/645,485

(22) Filed: Aug. 22, 2003

(65) Prior Publication Data

US 2005/0039607 A1    Feb. 24, 2005

(51) Int. Cl.
*B23Q 3/10* (2006.01)
*B23Q 3/00* (2006.01)

(52) U.S. Cl. .................. 241/274; 269/289 R; 269/290; 269/291; 269/292

(58) Field of Classification Search .............. 241/274; 269/289 R, 290, 291, 292
See application file for complete search history.

(56) References Cited

U.S. PATENT DOCUMENTS

| D304,276 | S |   | 10/1989 | Wolff |   |
|---|---|---|---|---|---|
| 4,907,789 | A | * | 3/1990 | Tice | ............................ 269/13 |
| D374,380 | S | * | 10/1996 | Sawatsky | ..................... D7/698 |
| D381,564 | S |   | 7/1997 | Kolada |   |
| 6,359,239 | B1 |   | 3/2002 | Missler |   |
| 6,371,470 | B1 | * | 4/2002 | Ward | ...................... 269/289 R |
| 6,722,644 | B1 | * | 4/2004 | Prosser | ................... 269/289 R |

FOREIGN PATENT DOCUMENTS

GB             2264224          2/1992

* cited by examiner

*Primary Examiner*—Derris H. Banks
*Assistant Examiner*—Jason Y. Pahng

(57) ABSTRACT

An implement for supporting foodstuff and allowing food preparation operations to be performed thereon. The implement includes a body having a substantially planar working surface. The working surface includes a main area and at least one substantially coplanar auxiliary area. The auxiliary area has at least a protruding portion thereof protruding integrally and outwardly from the main area. The auxiliary area has a geometrical configuration distinct from that of the main area so as to facilitate visual identification thereof and visual differentiation thereof from the main area. The main and auxiliary areas are adapted to improve the cognitive ergonomicity of the implement by facilitating the delimitation of distinct coplanar and adjacent working areas for performing corresponding distinct food preparation operations. The implement includes a discharge aperture extending therethrough and a plurality of adaptors connectable thereto for performing various culinary operations.

18 Claims, 15 Drawing Sheets

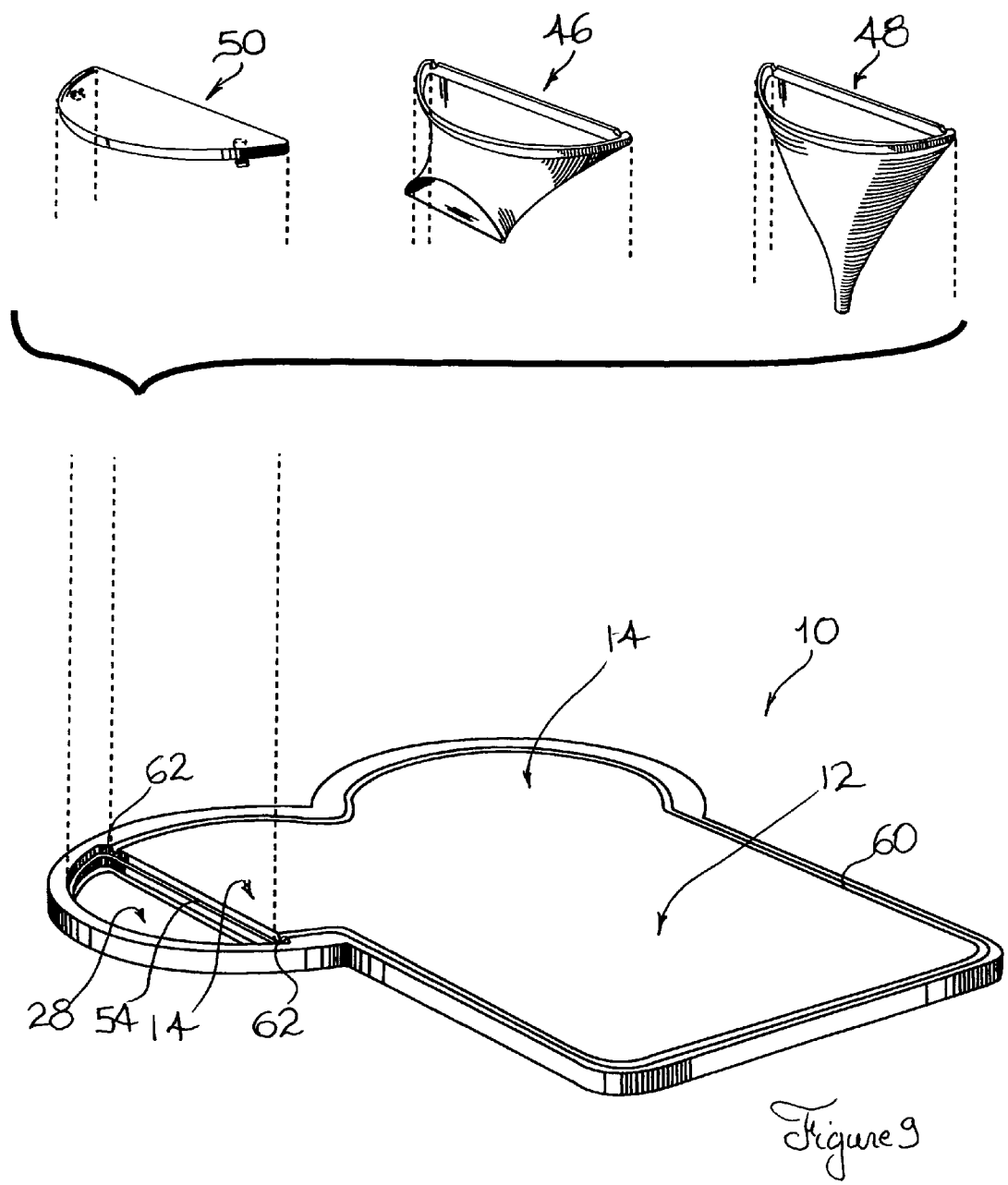

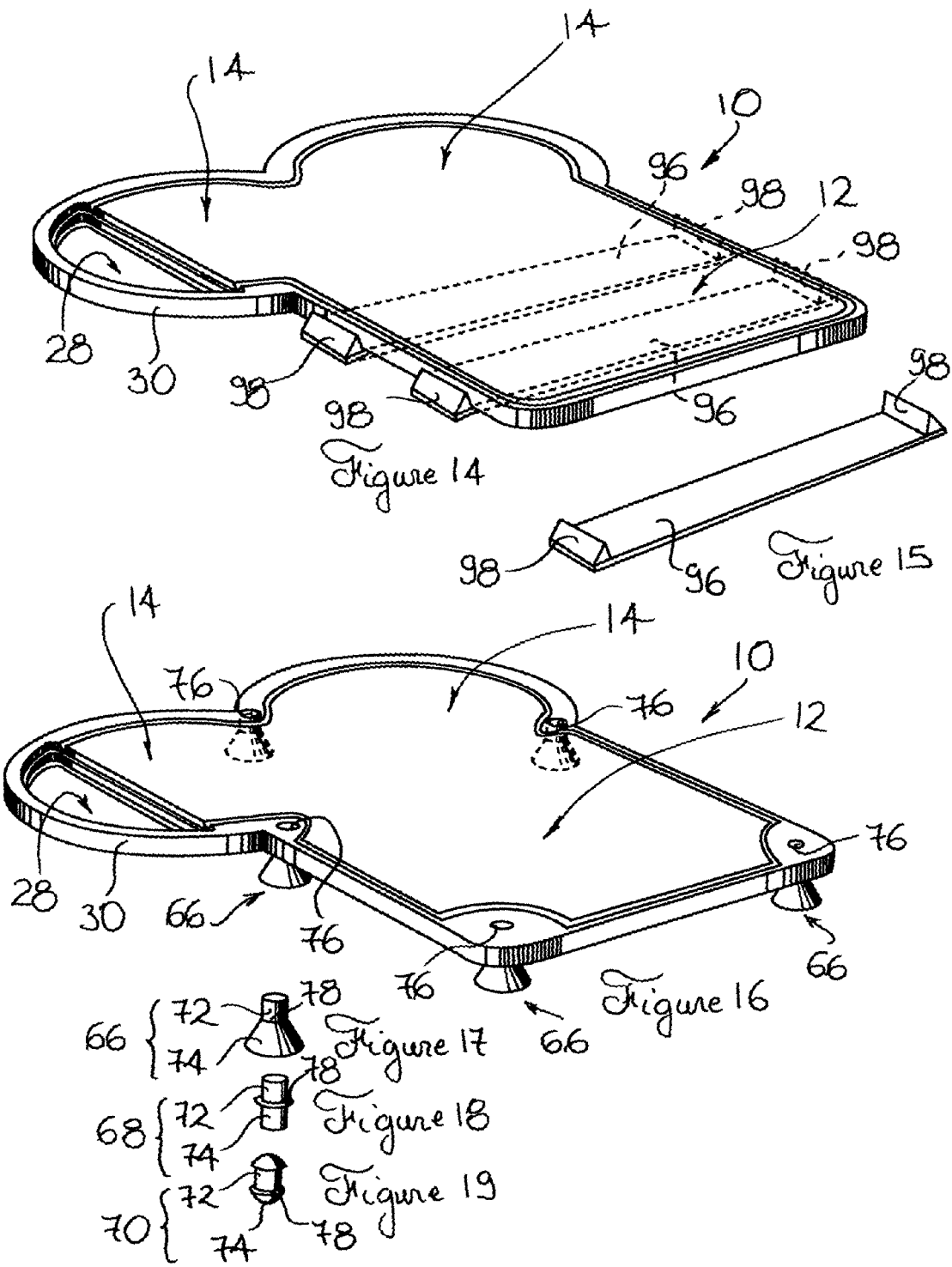

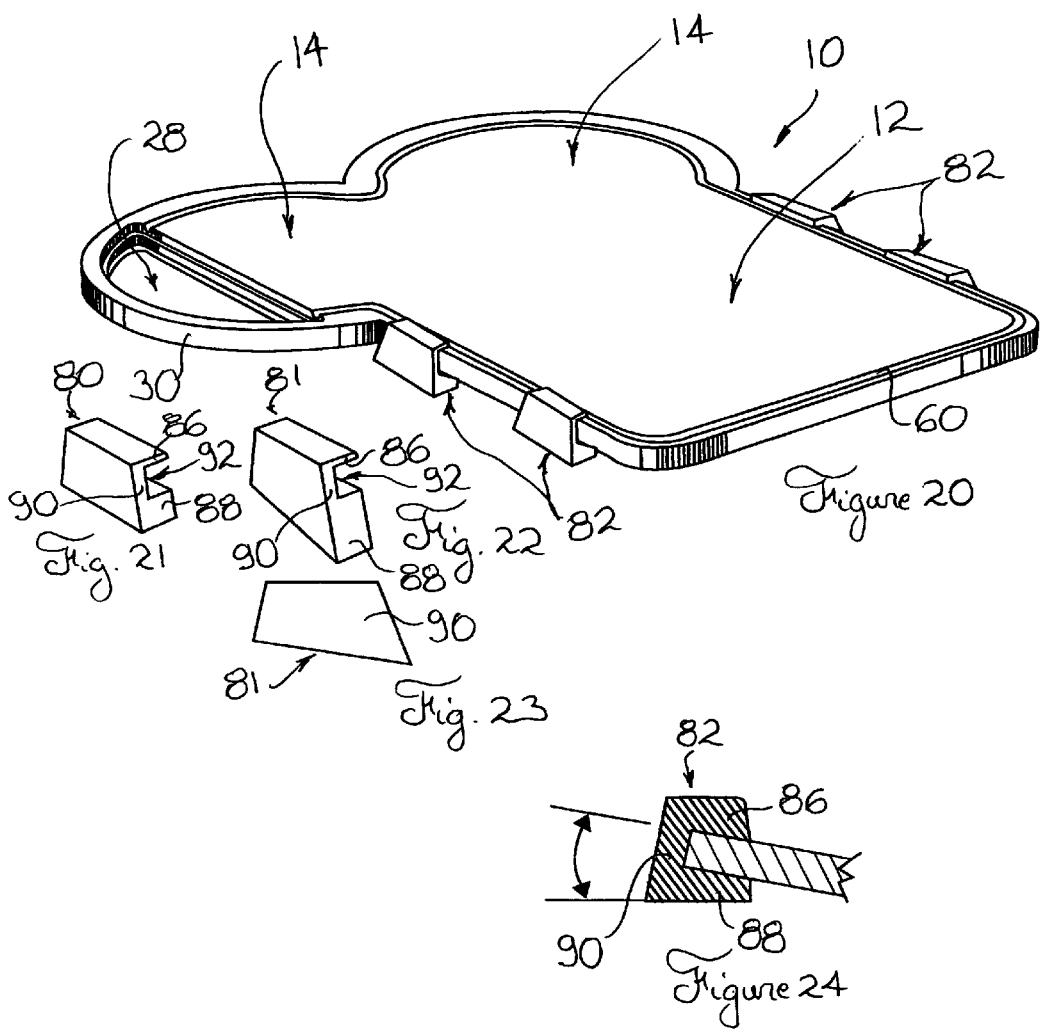

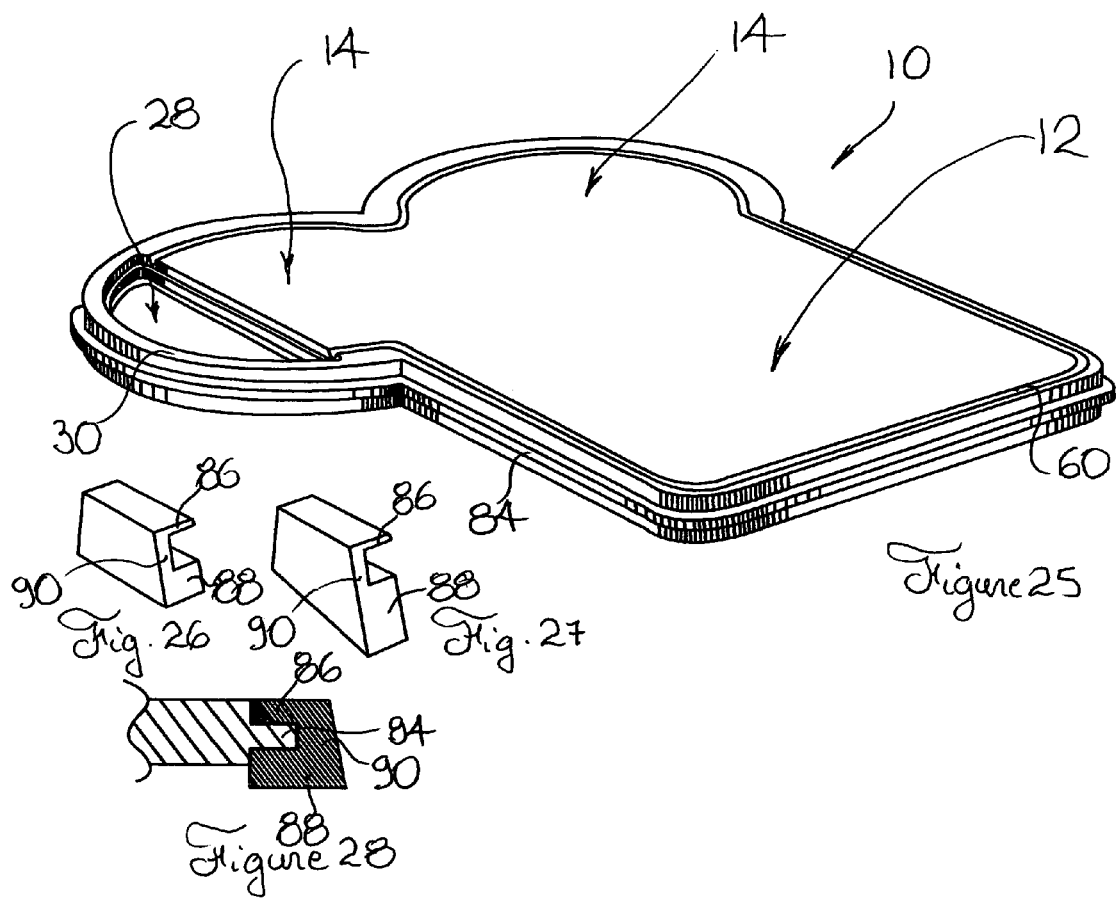

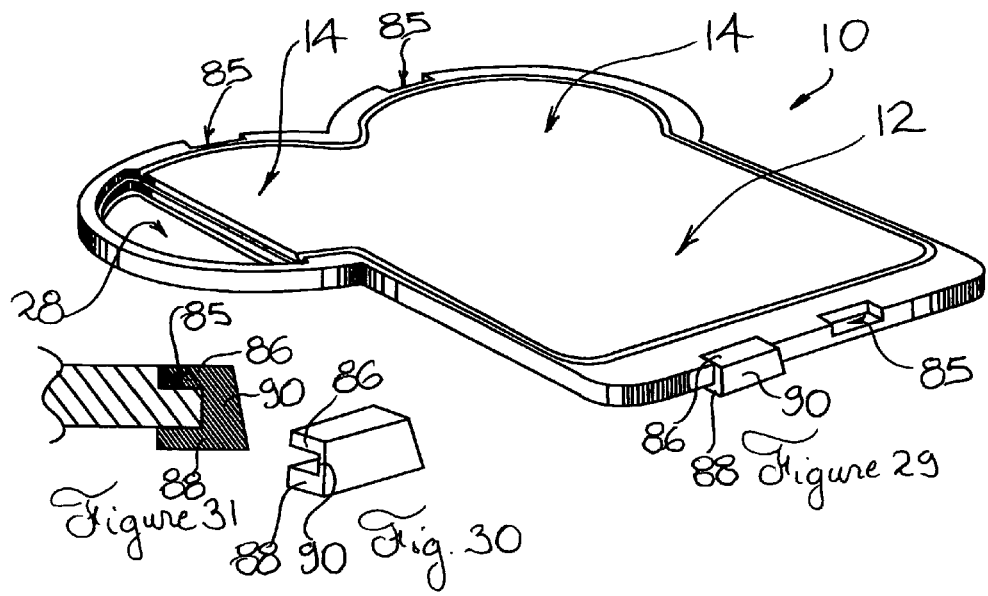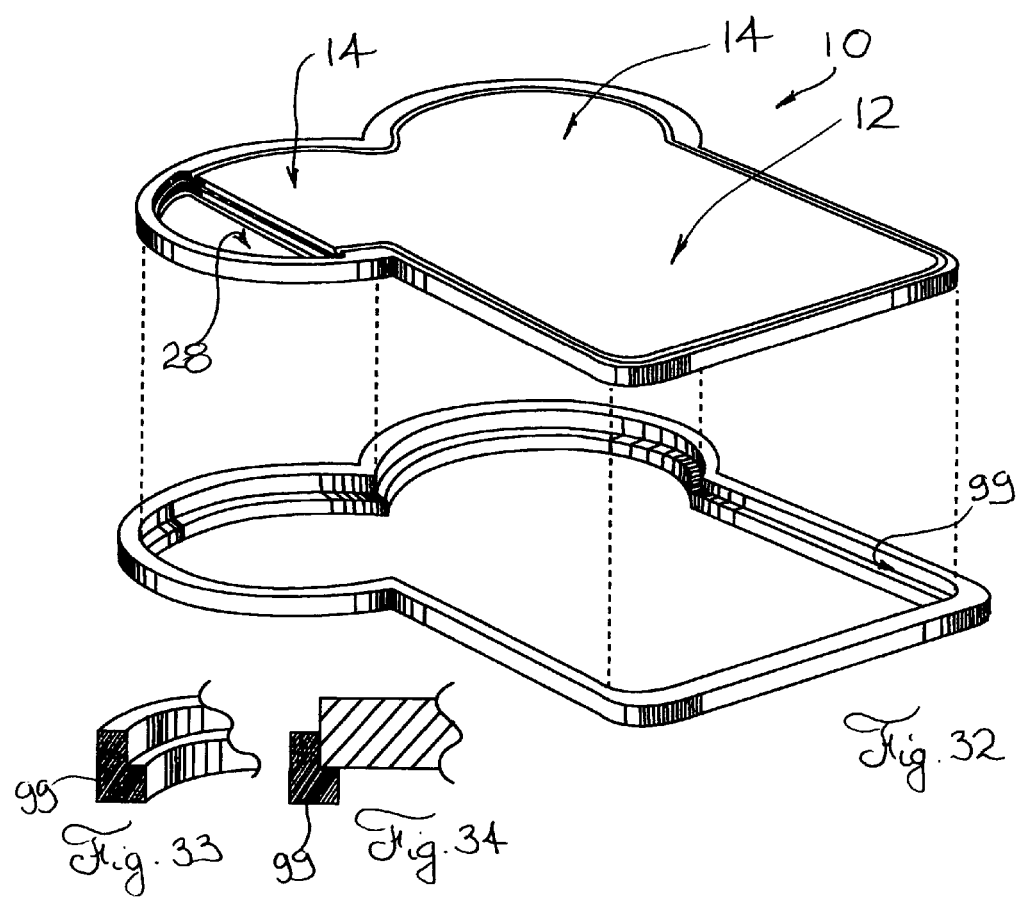

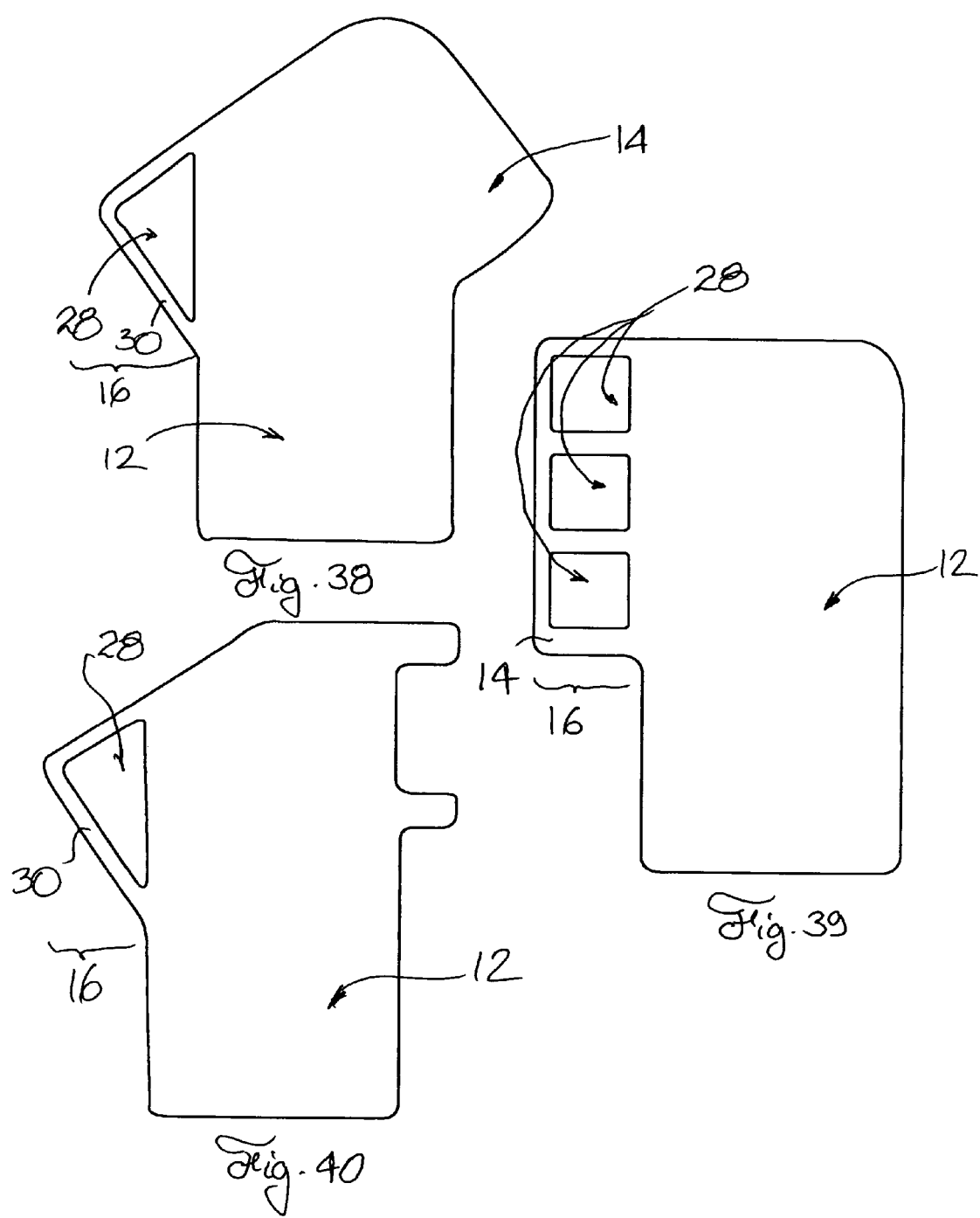

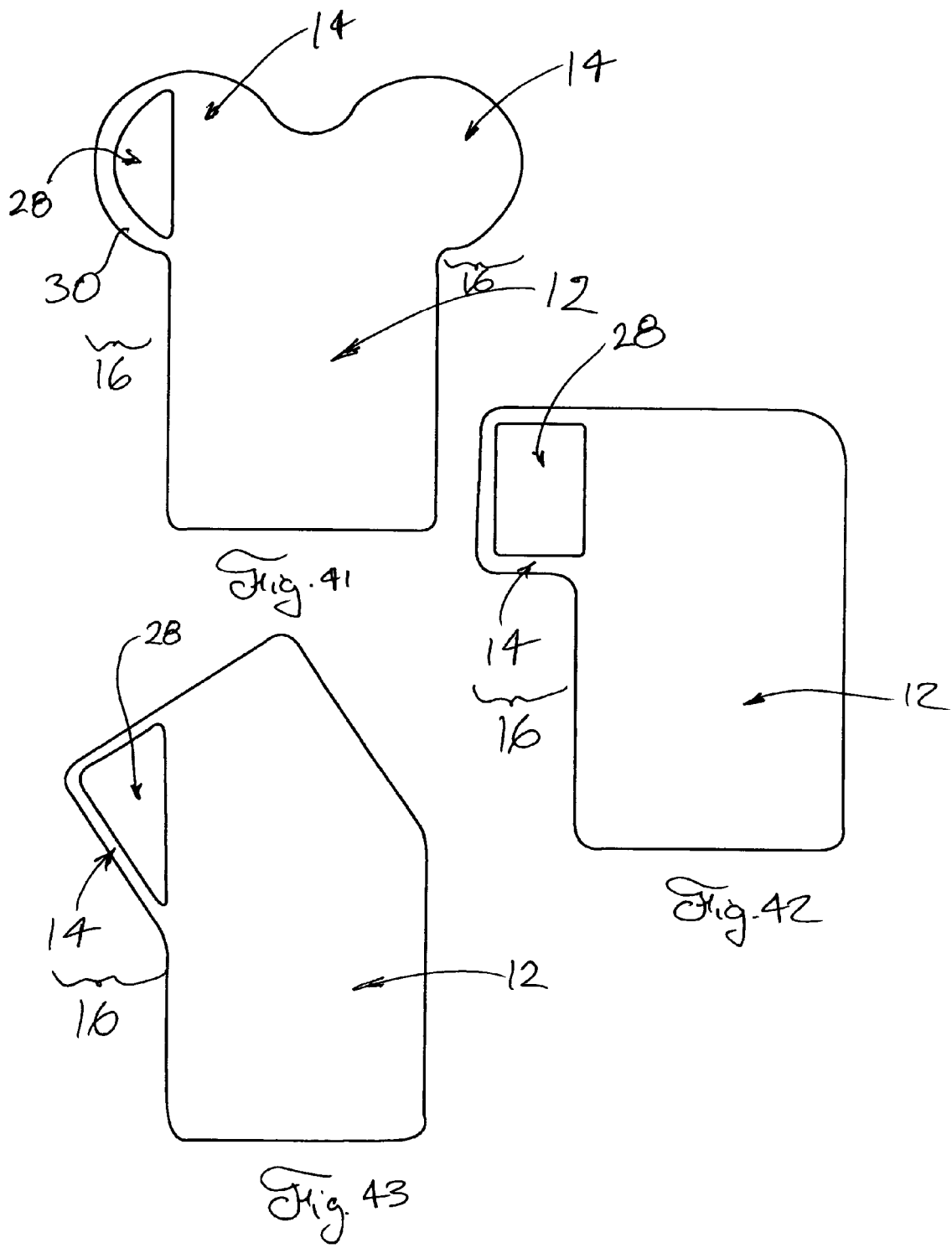

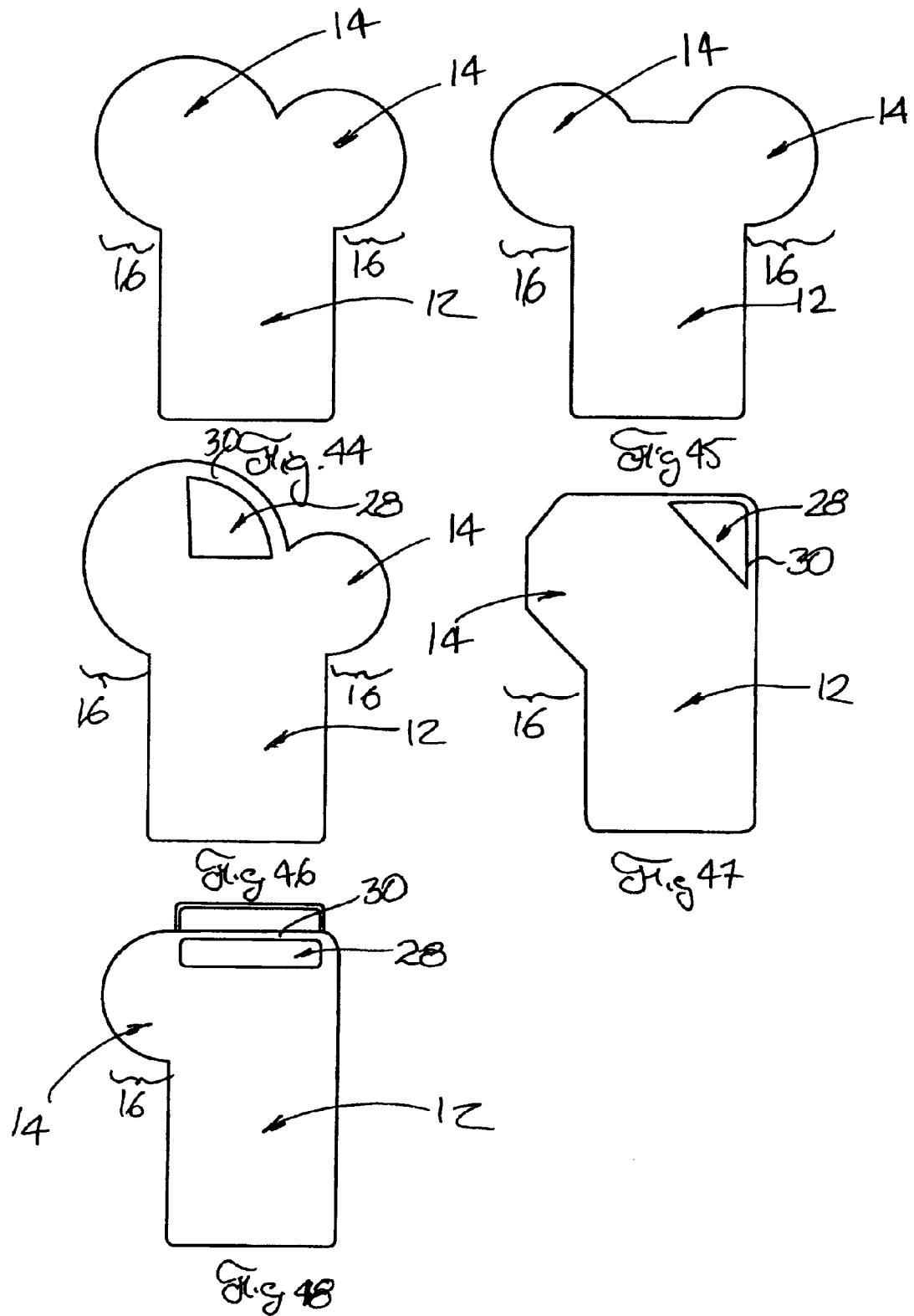

FOOD PREPARATION IMPLEMENT

FIELD OF THE INVENTION

The present invention relates to the field of culinary implements and is particularly concerned with a multifunctional food preparation implement.

BACKGROUND OF THE INVENTION

Various types of processing operations are typically performed on foodstuffs prior to their serving. For example, foodstuff such as vegetables, fruits, meats, fish and the like are often sliced, chopped or otherwise cut in preparation for cooking and/or serving.

Usually, so-called cutting boards are utilized, typically in the vicinity of a sink for the cutting of foodstuffs. The conventional cutting board includes a planar surface against which foodstuffs are held while a cutting tool is hand driven in a slicing or chopping manner. The conventional cutting board is typically made of material which can withstand the cutting action of knives and the like and is generally large and heavy enough to accommodate food storage and to remain stationary while cutting pressure and motion are exerted thereon.

Although useful as a food holder and surface against which to drive a cutting tool, the conventional cutting board has certain limitations and presents some drawbacks. For example, prior art cutting boards generally do not provide means for the convenient separation of usable food portions from food scrap, of usable portions between themselves and of both usable portions and debris from the foodstuff being processed.

Indeed, in the normal use of conventional cutting boards, it is common to cut an item and create at least one usable or edible portion and at least one unusable portion which is eventually discarded. Currently, the unusable portion is pushed to one side while the user continues to cut the item into usable and unusable portions. The item being cut is hence processed or cut amongst both usable and unusable portions, the unusable portions being periodically removed.

This situation results in poor cognitive ergonomics. Indeed, the cutting operation in itself often requires a certain degree of manual dexterity and a certain amount of mental concentration. A certain amount of stress is also often present since the cutting operation, even if performed in an ideal environment, may lead to bodily injury. Performing the cutting operation in a cluttered environment increases the already high level of required attentiveness or mental concentration and the stress associated with such an operation. This may lead to increased mental fatigue which, in turn, may lead to an increased risk of bodily injury.

Furthermore, with the current method, the user has to periodically sweep the unusable portion of the food being prepared into a receptacle, either a trash container or a sink with a disposal unit so that they can reclaim enough surface area on the cutting board to continue with their cutting activity. The cut or chopped usable food is also scraped from the board into a separate receptacle from time to time to prevent the working surface from becoming cluttered and to prevent the usable portions from being potentially soiled or contaminated. Cut or chopped usable foodstuff is often scrapped or otherwise moved into a plurality of possible implements such as graters, strainers, scales or the like.

The act of removing excess debris or usable food portions from a cutting board is time consuming and potentially messy since the user must scoop up the debris and/or usable portions and transport the debris and/or usable portions from the cutting surface respectively to a trash and/or to a suitable container or implement. For example, when washing cut vegetables it is often expedient to utilize a wire mesh strainer or the like. In such instances, it is necessary to transfer the foodstuffs to the strainer and to then discard the unwanted trimmed portions, either in a trash receptacle or sink disposal unit.

This method of preparing food hence frequently results in spilling some of the food on the floor where it creates a hazard in that people stepping on the spilled food are apt to slip and fall resulting in bodily injury. Moreover, the operation of scraping or scooping up and transporting the chopped food or excess debris into a separate receptacle, implement or trash requires extra time and additional working space which would otherwise be available for other kitchen work.

Conventional boards also present health hazards as they provide a platform for sharing germs. For example, a conventional cutting board may used for cutting raw meat and, subsequently, for cutting food. Without a thorough wash between the placement of different foods, germs are likely to be transferred to the subsequently disposed foods, which may be especially hazardous if such subsequently placed foods are not to be cooked. Washing a cutting board between each placement of food can be quite time consuming and, hence, impractical.

Accordingly, there exists a need for a cutting board providing for conveniently located holding sections which are conveniently located in close relation to the cutting board so that the user can quickly sweep selected items into corresponding easily discernable holding sections.

Furthermore, at least one of the holding sections would ideally allow for mounting thereunto of at least one food processing implement. There also exists a need for a cutting board having distinct work areas that can be used either for the same food at different preparational stages thereof, or for different foods mixed in a recipe or maintained separate for hygienic purposes or the like.

Most conventional cutting boards also suffer from having to be moved repetitively towards and away from a sink. For example, during food processing, it is generally necessary to move the board towards a sink for washing cut foodstuffs and/or the board itself.

Large cutting boards, while more efficient in use, are generally bulkier and more inconvenient to handle and wash then smaller and light-weight cutting boards. However, smaller, lighter weight cutting boards generally have a tendency to move under heavy cutting action and therefore require stabilizing. Over the sink cutting boards which mount and are supported above a sink by means of extendable arms or the like are known. Such boards, however, are limited to the placement over one sink and effectively block the use of that sink during utilization of the board.

It would therefore be an advantage to overcome certain problems and inconveniences of prior art cutting boards by providing an improved cutting board having a portion thereof which can be used directly over a kitchen sink, is light-weight and, yet, is easily and effectively stabilized during use.

For cutting flesh, carving trays having channels to convey juices to one location have been devised. In addition, cutting surfaces having different sized and shaped areas and having different surface textures to aid in returning in position the material being cut have been produced. However, conventional cutting boards or trays are typically designed for only one type of use. Accordingly, various trays having different size, shape and surface textures typically must be purchased and stored. The simultaneous or sequential use of various boards often leads to an unergonomic and cluttered work surface.

SUMMARY OF THE INVENTION

It is a general object of the present invention to provide a multifunctional culinary implement circumventing at least some of the drawbacks associated with conventional culinary cutting boards.

Advantages of the present invention include that the proposed implement provides a working surface defining visually distinct areas adapted for distinct usages. The distinct areas may be used for performing distinct food preparation processes and/or for supporting various food products and/or a food product at various stages of preparation. The visually distinct areas are adapted to reduce cluttering and increase cognitive ergonomicity of the working surface without compromising on physical ergonomicity.

The proposed implement is characterized by its versatility and is provided with interchangeable adaptors readily mountable thereto for performing specialized food preparation operations, such as grating, measuring, weighting and the like. The implement allows for scrapping of foodstuff between distinct areas and towards the adaptors without the need for lifting the foodstuff away from the implement and with reduced risks of spillage of the food stuff.

The implement reduces the labour involved in transferring foodstuff between food preparation stages and reduces the required table or counter top surface. The separate areas are also adapted to prevent contamination of food products therebetween hence promoting a more hygienic use of the work surface.

The proposed implement is preferably provided with a pair of opposed working surfaces providing distinct features such as a drainage groove, a textured surface or the like so as to further increase its versatility.

The proposed implement is configured so as to allow a protruding section thereof, possibly supporting a specialized adaptor, to be cantilevered over an open area such as a sink while remaining stably supported on an adjacent supporting surface such as a table or counter top.

The proposed implement is typically provided with at least one foot releasably attachable thereto for spacing and/or tilting its working surfaces relative to a supporting surface. The proposed implement is typically provided with a discharge aperture also usable as a handle or a hanging aperture.

The proposed implement is designed so as to be manufacturable using conventional forms of manufacturing so as to provide an implement that is economically feasible, long lasting and relatively trouble free in operation.

In accordance with an embodiment of the present invention, there is provided an implement for supporting foodstuff and allowing food preparation operations to be performed thereon, the implement being mountable over a supporting surface defining an adjacent open area and being usable with an open top receptacle, the implement comprising: a body having a substantially planar working surface, the working surface including a main area and at least one substantially coplanar auxiliary area, the auxiliary area having at least a protruding portion thereof protruding integrally and outwardly from the main area, the auxiliary area having a geometrical configuration distinct from that of the main area so as to facilitate visual identification thereof and visual differentiation thereof from the main area; whereby the main and auxiliary areas are adapted to improve the cognitive ergonomicity of the implement by facilitating the delimitation of distinct coplanar and adjacent working areas for performing corresponding distinct food preparation operations.

Conveniently, the main and auxiliary areas are configured and sized so that the auxiliary area is positionable as a cantilever overlying the open area while the main area rests on the working surface for stably supporting the implement.

Typically, the main area has a substantially rectangular configuration.

Conveniently, the auxiliary area has a substantially arcuate auxiliary area peripheral edge and the main area defines a substantially rectilinear main area peripheral edge segment positioned adjacent the auxiliary area peripheral edge.

Typically, the main area has a substantially rectangular configuration.

Conveniently, the working surface includes a main area and a pair of substantially coplanar auxiliary areas protruding integrally and outwardly therefrom.

Typically, each of the auxiliary areas defines a corresponding auxiliary area peripheral edge, both the auxiliary area peripheral edges having a substantially arcuate configuration; whereby the auxiliary area peripheral edges together form generally the outline of the number 3.

In one embodiment of the invention, the implement has substantially the configuration of a chef hat.

Preferably, the implement includes a discharge aperture extending through part of the auxiliary area.

Conveniently, the working surface is provided with a drainage groove formed thereon for receiving liquids emanating from the working surface, the drainage groove being in fluid communication with the discharge aperture for allowing the liquids to flow from the drainage groove into the drainage aperture.

In at least one embodiment of the invention, the discharge aperture has a substantially "D"-shaped configuration.

Conveniently, the auxiliary area defines an auxiliary area peripheral edge and wherein auxiliary area is provided with a discharge aperture extending therethrough; the discharge aperture being located substantially adjacent to the auxiliary area peripheral edge; the auxiliary area defining a graspable segment thereof located between the auxiliary area peripheral edge and the discharge aperture; the graspable segment being configured and sized for allowing grasping thereof by the hand of an intended user.

Typically, the auxiliary area is provided with a discharge aperture extending therethrough; the implement being provided with an adaptor operatively attachable to the discharge aperture.

In at least one embodiment of the invention, the adaptor includes a open-top container, the open-top container being configured and sized so as to allow the foodstuff to be scraped thereinto from the working surface when operatively coupled to the discharge aperture.

Conveniently, the open-top container is provided with an open-top container lid releasably attachable thereto.

Typically, the open-top container defines a container peripheral edge substantially coplanar with the working surface when the open-top container is operatively coupled to the discharge aperture.

Conveniently, the working surface is provided with a drainage groove formed thereon for receiving liquids, the drainage groove being in fluid communication with the discharge aperture, the open-top container allowing the liquid to flow thereinto from the drainage groove when operatively coupled to the discharge aperture.

In at least one embodiment of the invention, the implement includes at least two open-top containers of different volumes, each of the open-top container being configured and sized so as to allow the foodstuff to be scraped thereinto from the working surface when operatively coupled to the discharge aperture.

In at least one embodiment of the invention, the adaptor includes a strainer, the strainer being configured and sized so as to allow the foodstuff to be scraped thereinto from the working surface when operatively coupled to the discharge aperture.

In at least one embodiment of the invention, the adaptor includes a grater, the grater being configured and sized so as to allow the foodstuff to be scraped thereunto from the working surface when operatively coupled to the discharge aperture.

In at least one embodiment of the invention, the adaptor includes a measuring component, the measuring component including at least two measuring recesses of different volumes formed thereinto, the measuring component being configured and sized so as to allow the foodstuff to be scraped into the at least two measuring recesses from the working surface when operatively coupled to the discharge aperture.

In at least one embodiment of the invention, the adaptor includes a funnel, the funnel being configured and sized so as to allow the foodstuff to be scraped thereinto from the working surface when operatively coupled to the discharge aperture.

In at least one embodiment of the invention, the adaptor includes a chute, the chute being configured and sized so as to allow the foodstuff to be scraped thereinto from the working surface when operatively coupled to the discharge aperture.

In at least one embodiment of the invention, the adaptor includes a weighting component, the weighting component being configured and sized so as to allow the foodstuff to be scraped thereunto from the working surface when operatively coupled to the discharge aperture.

In at least one embodiment of the invention, the adaptor includes a covering component, the covering component being configured and sized so as to cover the discharge aperture and allow the foodstuff to be scraped thereunto from the working surface when operatively coupled to the discharge aperture.

Conveniently, the adaptor is provided with an adaptor releasable attachment means for releasably attaching the adaptor to the working surface so that the adaptor extends at least partially into the discharge aperture.

Typically, the adaptor releasable attachment means allows an upper surface of the adaptor to be substantially coplanar with the working surface when the adaptor is releasably attached to the working surface.

Conveniently, the adaptor includes a peripheral hooking protrusion extending therefrom; the discharge aperture defining a discharge aperture peripheral edge, the discharge aperture peripheral edge including a peripheral attachment recess formed therein for substantially complementarily receiving the hooking protrusion and supporting the latter.

Typically, the implement comprises both a first working surface and an opposed second working surface; the discharge aperture extending between the first and second working surfaces; the releasable attachment means allowing the adaptor to be releasably attached to the implement so as to be usable with either one of the first or second working surfaces.

Conveniently, the adaptor includes a peripheral hooking protrusion extending therefrom; the discharge aperture defining a discharge aperture peripheral edge, the discharge aperture including a first and a second peripheral attachment recess formed respectively in the first and second working surfaces for substantially matingly receiving the hooking protrusion and supporting the latter.

Conveniently, the hooking protrusion has a substantially rectangular-shaped cross sectional configuration and the first and second attachment recesses are each substantially complementarily shaped relative to the hooking protrusion, the first and second attachment recesses being substantially symmetrically disposed relative to each other.

Conveniently, the hooking protrusion has a substantially triangular-shaped cross sectional configuration and the first and second attachment recesses are each substantially complementarily shaped relative to the hooking protrusion, the first and second attachment recesses being substantially symmetrically disposed relative to each other.

Typically, the hooking protrusion has a substantially sector-shaped cross sectional configuration and the first and second attachment recesses are each substantially complementarily shaped relative to the hooking protrusion, the first and second attachment recesses being substantially symmetrically disposed relative to each other.

Typically, the implement comprises a spacing means for maintaining the body in a spaced relationship relative to the supporting surface when the implement is resting on the supporting surface.

Typically, the implement comprises a tilting means for tilting at least part of the working surface relative to the supporting surface when the implement is resting on the supporting surface.

Typically, the implement comprises both a first working surface and an opposed second working surface, the adaptor further comprising a spacing means for maintaining the body in a spaced relationship relative to the supporting surface when the implement is resting on the supporting surface with the first or second working surfaces selectively facing upwardly away from the supporting surface.

Typically, the implement comprises both a first working surface and an opposed second working surface, the adaptor further comprising a tilting means for tilting at least part of the working surface relative to the supporting surface when the implement is resting on the supporting surface with the first or second working surfaces selectively facing upwardly away from the supporting surface.

Typically, the implement comprises at least one foot extending substantially outwardly from the body for supporting the implement on the supporting surface.

Conveniently, the at least one foot is releasably attached to the body.

In at least one embodiment of the invention, the at least one foot includes a foot attachment segment and a foot abutment segment, the body including a foot attachment aperture formed therein, the foot attachment segment being substantially fittingly insertable into the foot attachment aperture.

In at least one embodiment of the invention, the body defines a body peripheral edge and a body thickness, the at least one foot having a substantially "C"-shaped cross-sectional configuration defining an abutment segment and an attachment segment maintained in a spaced apart and parallel relationship relative to each other by a substantially perpendicular spacing segment, the body peripheral edge being substantially fittingly insertable between the abutment and attachment segments.

In accordance with the present invention, there is also provided an implement for supporting foodstuff and allowing food preparation operations to be performed thereon, the implement being mountable over a supporting surface, the implement comprising: a body having a substantially planar working surface, the working surface including a main area and at least one auxiliary area, the main and auxiliary areas being substantially coplanar, the main and auxiliary areas respectively defining a main area peripheral edge and an auxiliary area peripheral edge; the main and auxiliary area peripheral edges having distinct geometrical configurations for facilitating the visual identification and recognition thereof; whereby the main and auxiliary areas are adapted to be used for distinct food preparation operations and wherein the foodstuff is scrappable between the main and auxiliary areas.

Conveniently, at least part of the auxiliary area forms a protruding portion protruding outwardly from an adjacent portion of the main area peripheral edge.

Conveniently, the main area and the protruding portion are configured and sized so that the implement is stably supported when the main area is rested on the supporting surface with the protruding portion extending away from the supporting surface; whereby the protruding portion is stably positionable over an open area.

Typically, the protruding portion includes a discharge aperture extending therethrough; whereby the foodstuff may fall into the open area through the discharge aperture when the protruding portion is positioned in an overlying relationship with the open area and the foodstuff is scrapped into the discharge aperture.

Conveniently, the main area peripheral edge includes at least one substantially rectilinear edge segment and wherein the auxiliary area peripheral edge includes an arcuate edge segment.

The advantages of the present invention include that the proposed implement is specially adapted for use directly adjacent to or over a sink and for accommodating the simultaneous operations such as washing and discarding of portions of vegetables and the like prepared thereon. The operation of cutting, storing, washing and discarding foodstuff is facilitated directly in the area in which each of the above functions is most expediously effected in the most sanitary configuration. Also, the board is designed so as to reduce mental fatigue associated with performing multiple culinary tasks or steps in a relatively confined area by providing easily identifiable and ergonomic working areas.

The board is designed so as to be able to straddle the sink rim or dividers so as to provide a food preparation implement having a lateral portion thereof overhanging the sink basins again so as to facilitate some of the culinary steps.

BRIEF DESCRIPTION OF THE DRAWINGS

FIG. 9 in a perspective view, illustrates a food preparation implement in accordance with an embodiment of the present invention, the implement being shown with a variety of adaptors about to be mounted thereto;

FIG. 14 in a perspective view, illustrates a food preparation implement in accordance with an embodiment of the present invention, the implement being shown with a pair of supporting components positioned thereunderneath;

FIG. 15 in a perspective view, illustrates a supporting component part of the implement shown in FIG. 14;

FIG. 16 in a perspective view, illustrates a food preparation implement in accordance with an alternative embodiment of the invention having a set of supporting feet extending therefrom;

FIG. 17 in a perspective view, illustrates a configuration of a foot component part of the food preparation implement shown in FIG. 16;

FIG. 18 in a perspective view, illustrates an alternative embodiment of the foot component shown in FIG. 17;

FIG. 19 in a perspective view, illustrates an alternative embodiment of the foot component shown in FIGS. 17 and 18;

FIG. 20 in a perspective view, illustrates a food preparation implement in accordance with an alternative embodiment of the invention, the implement being shown with the feet component having an alternative configuration mounted thereto;

FIG. 21 in a perspective view, illustrates a foot component such as shown in FIG. 20;

FIG. 22 in a perspective view, illustrates a foot component in accordance with an alternative embodiment of the invention;

FIG. 23 in an elevational view, illustrates the foot component shown in FIG. 22;

FIG. 24 in a partial transversal cross-sectional view with sections taken out, illustrates a peripheral edge of a food preparation implement mounted within a foot component both part of a food preparation implement in accordance with an embodiment of the present invention;

FIG. 25 in a perspective view illustrates a food preparation implement in accordance with an alternative embodiment of the invention;

FIG. 26 in a perspective view illustrates a foot component usable with the food preparation implement shown in FIG. 25;

FIG. 27 in a perspective view illustrates an alternative embodiment of a foot component usable with the cutting shown in FIG. 25;

FIG. 28 in a partial cross-sectional view with sections taken out illustrates the foot component shown in FIG. 27 mounted on the peripheral edge of the food preparation implement shown in FIG. 25;

FIG. 29 in a perspective view illustrates a food preparation implement in accordance with an alternative embodiment of the invention;

FIG. 30 in a perspective view illustrates a foot component usable with the food preparation implement shown in FIG. 29;

FIG. 31 in a partial cross-sectional view with sections taken out illustrates the foot component shown in FIG. 27 mounted on the peripheral edge of the food preparation implement shown in FIG. 25;

FIG. 32 in a perspective view illustrates a food preparation implement in accordance with an alternative embodiment of the invention;

FIG. 33 in a perspective view illustrates a foot component usable with the food preparation implement shown in FIG. 32;

FIG. 34 in a partial cross-sectional view with sections taken out illustrates the foot component shown in FIG. 33 mounted on the peripheral edge of the food preparation implement shown in FIG. 32;

FIGS. 38 through 48 in corresponding top views illustrate implements having alternate configurations

DETAILED DESCRIPTION

Figure 1:
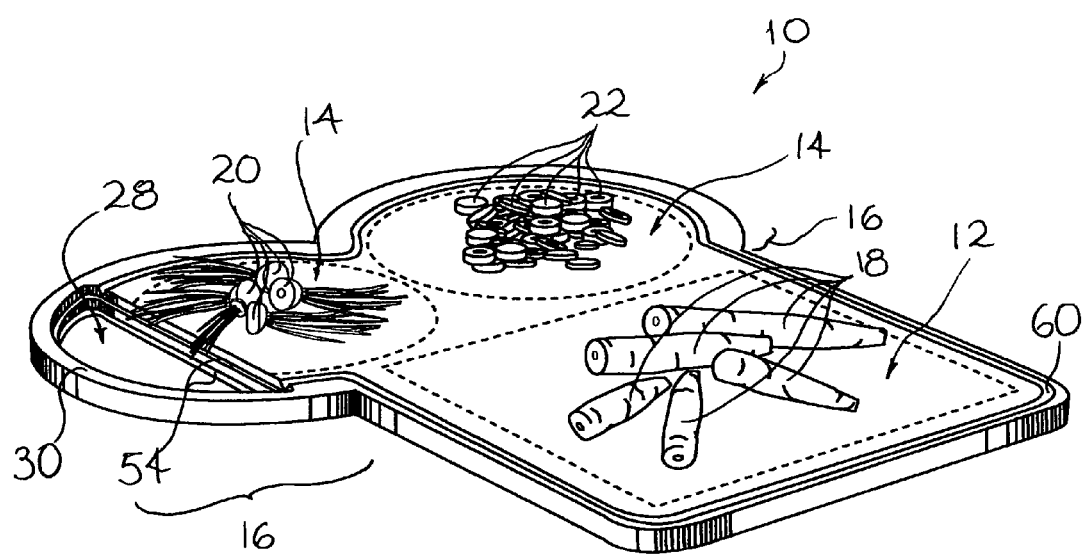
FIG. 1 in a perspective view, illustrates a food preparation implement in accordance with an embodiment of the present invention, the implement being shown used for supporting foodstuff thereon.

Referring to FIG. 1, there is shown a food preparation implement 10 in accordance with an embodiment of the present invention. The implement 10 is intended to be used mainly for supporting foodstuff and allowing food preparation operations to be performed thereon. In FIG. 1, the implement 10 is shown being used for processing carrots. It should, however, be understood that the implement 10 could be used for processing various other types of foodstuff without departing from the scope of the present invention.

The implement 10 comprises a body having at least one and typically two planar working surfaces. Each working surface includes a main area 12 and at least one substantially co-planar auxiliary area 14. In the embodiment shown in FIG. 1, the working surface defines a pair of adjacent auxiliary areas 14. It should, however, be understood that the implement 10 could have any suitable number of main and/or auxiliary areas without departing from the scope of the present invention.

The auxiliary area 14 has at least a protruding portion 16 thereof protruding integrally and outwardly from the main area 12. In the embodiment shown in FIG. 1, each auxiliary area 14 defines a corresponding protruding portion 16.

Each auxiliary area 14 has a corresponding geometrical configuration distinct from that of the main area 12. For example, in the embodiment shown in FIG. 1, the main area 12 has a substantially rectangular configuration whereas both auxiliary areas 14 have substantially truncated disc-shaped configurations. It should, however, be understood that the main and auxiliary areas 12, 14 could have any other suitable geometrical configuration facilitating visual identification and differentiation thereof without departing from the scope of the present invention.

Typically, the geometrical configuration of the various areas is reflected by the peripheral edge of the corresponding area. For example, the main and auxiliary areas respectively define a main area peripheral edge and an auxiliary area peripheral edge. The main and auxiliary peripheral edges typically have distinct geometrical configurations for facilitating the visual identification and recognition thereof.

In some embodiments of the invention, the main peripheral edge includes at least one substantially rectangular edge segment and the auxiliary area peripheral edge includes an arcuate edge segment. In the embodiment shown in FIG. 1, the working surface includes a main area 12 and a pair of substantially co-planar auxiliary areas 14 protruding integrally and outwardly therefrom.

Each of the auxiliary areas 14 defines a corresponding auxiliary area peripheral edge and both auxiliary area peripheral edges have a substantially arcuate configuration. When seen in a top view, the auxiliary area peripheral edges together form generally the outline of the number 3. Together with the main area 12, when seen in a top view, the working surface has substantially the configuration of a chef's hat wherein the peripheral edges of the auxiliary areas 14 form the top portion of the chefs hat and the opposed edge forms the head contacting portion of the hat.

The main and auxiliary areas 12, 14 are adapted to be used for distinct food preparation operations and/or for supporting distinct food products. In the example shown in FIG. 1 the main area 12 is adapted to support carrots 18 all having their head sections 20 removed while they are being chopped or diced into carrot discs 22. Hence, the main area 12 is adapted to be used for performing the dicing operation while the auxiliary areas 14 are adapted to be used respectively for receiving the carrot heads 20 about to be discarded and the carrot discs 22 about to be further processed.

Facilitation of the visual identification and differentiation of the main and auxiliary areas 14 improves the overall cognitive ergonomicity of the food preparation operation since it allows the intended user to mentally define individual sections allocated to specific tasks. Also, since the main and auxiliary sections 12, 14 are substantially co-planar the foodstuff is easily scrapable between the main and auxiliary areas 12, 14 during processing thereof.

Figure 37:
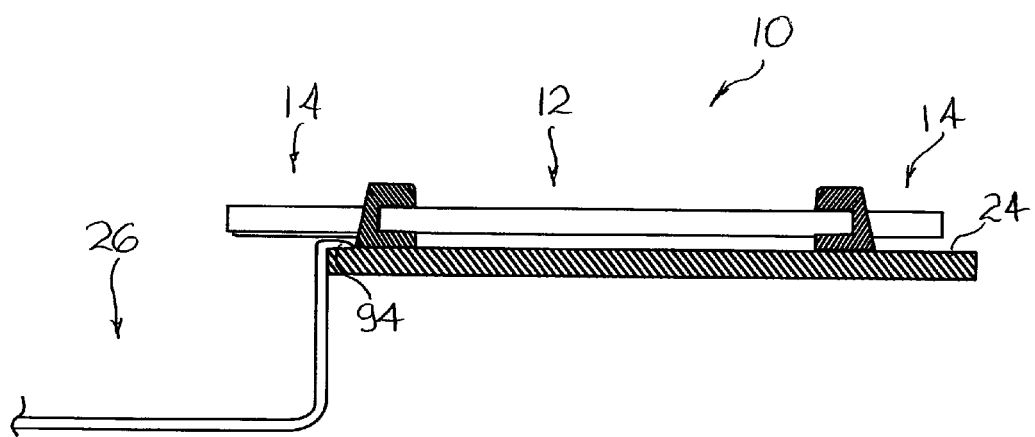
FIG. 37 in a partial transversal cross-sectional view with sections taken out, illustrates a food preparation implement in accordance with an embodiment of the present invention resting on a supporting surface and having a portion thereof extending over a sink.

As shown in FIG. 37, the implement 10 is adapted to be mounted over a supporting surface 24 such as a table top, counter top or the like. The working surface 24 typically defines an adjacent open area such as a surrounding area, a recessed sink 26 or the like. It should be understood that the implement 10 could be used in other contexts without departing from the scope of the present invention.

The main and auxiliary areas 12, 14 are configured and sized so that at least one of the auxiliary areas 14 is positionable as a cantilever overlying an open area 26 while the main area 12 rests on the working surface 24 for stably supporting the implement 10. In the example shown in FIG. 37, the main and auxiliary areas 12, 14 are configured and sized so that at least part of the left hand auxiliary area 14 may overhang the open area 26 of the sink. The remainder of the implement 10 has sufficient weight and defines a sufficient sustentation polygon for ensuring that the implement 10 remains stably supported by the supporting surface 24.

Referring back to FIG. 1, there is shown that the implement 10 typically also includes a discharge aperture 28 extending through part of at least one of the auxiliary areas 14. Typically, the discharge aperture 28 is located substantially adjacent to the corresponding auxiliary area peripheral edge. The concerned auxiliary area 14 hence defines a graspable segment 30 thereof located between the auxiliary area peripheral edge and the discharge aperture 28.

Figure 35:
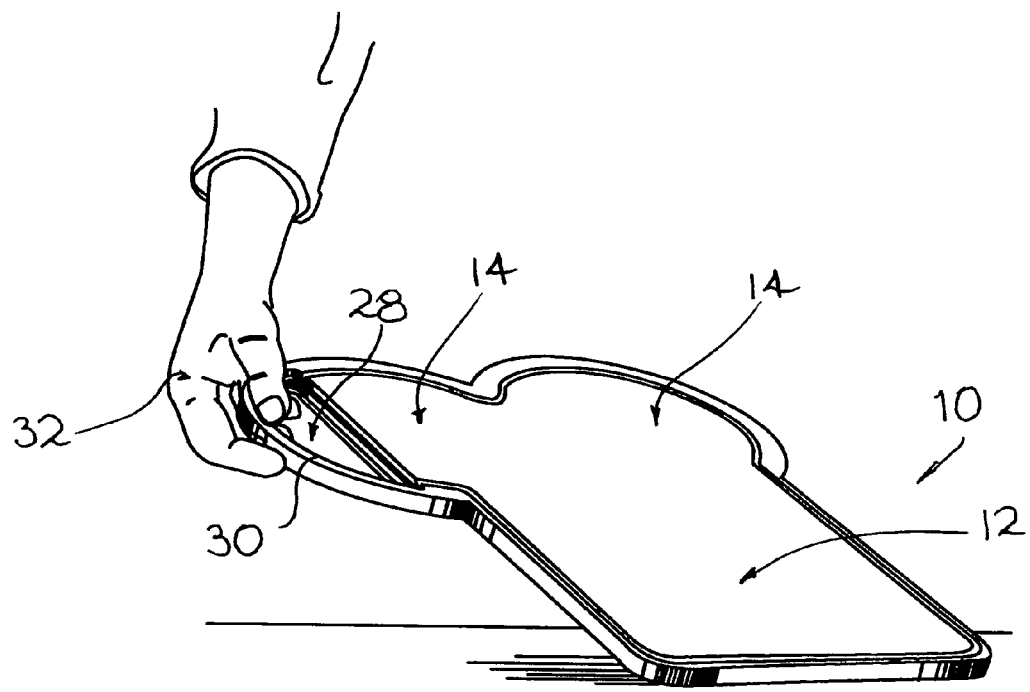
FIG. 35 illustrates a food preparation implement part of the food preparation implement in accordance with an embodiment of the present invention, the food food preparation implement being shown grasped by the hand of an intended user.
Figure 36:
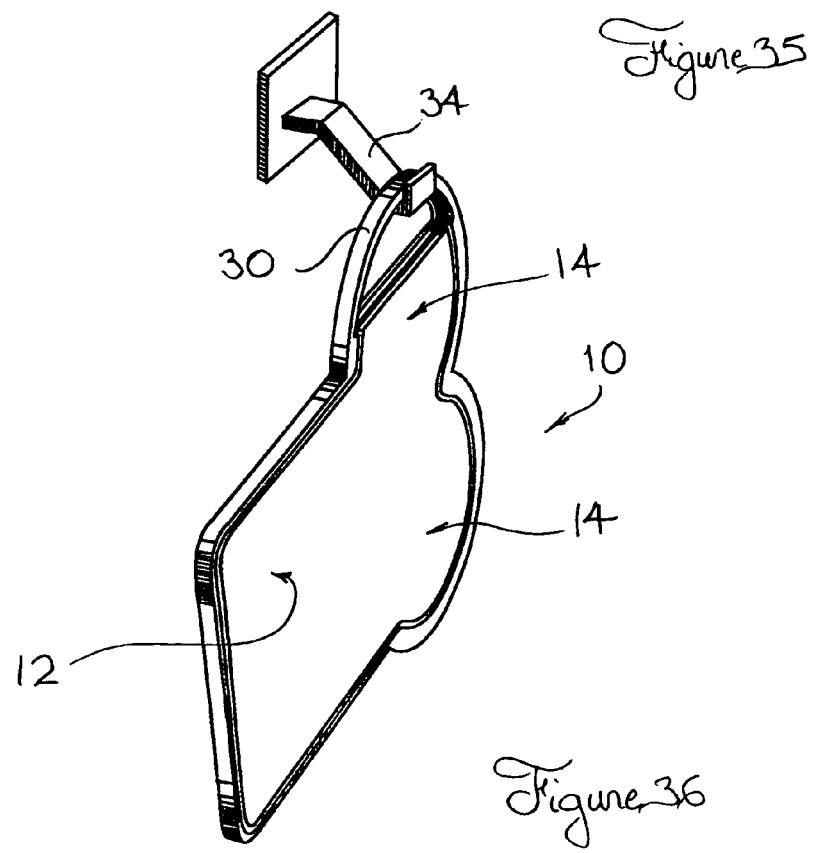
FIG. 36 in a perspective view, illustrates a food preparation implement in accordance with an embodiment of the present invention, the food preparation implement being shown suspended from a wall hook component.

As shown in FIG. 35, the graspable segment 30 is configured and sized for allowing grasping thereof by the hand 32 of an intended user. As shown in FIG. 36, the graspable segment 30 is also usable for hooking the implement 10 to a wall hook 34 or other suitable hooking means.

In the embodiments shown throughout the Figures, the discharge aperture 28 has a substantially D-shaped configuration. It should, however, be understood that the discharge aperture 28 could have other configurations without departing from the scope of the present invention.

Figure 4:
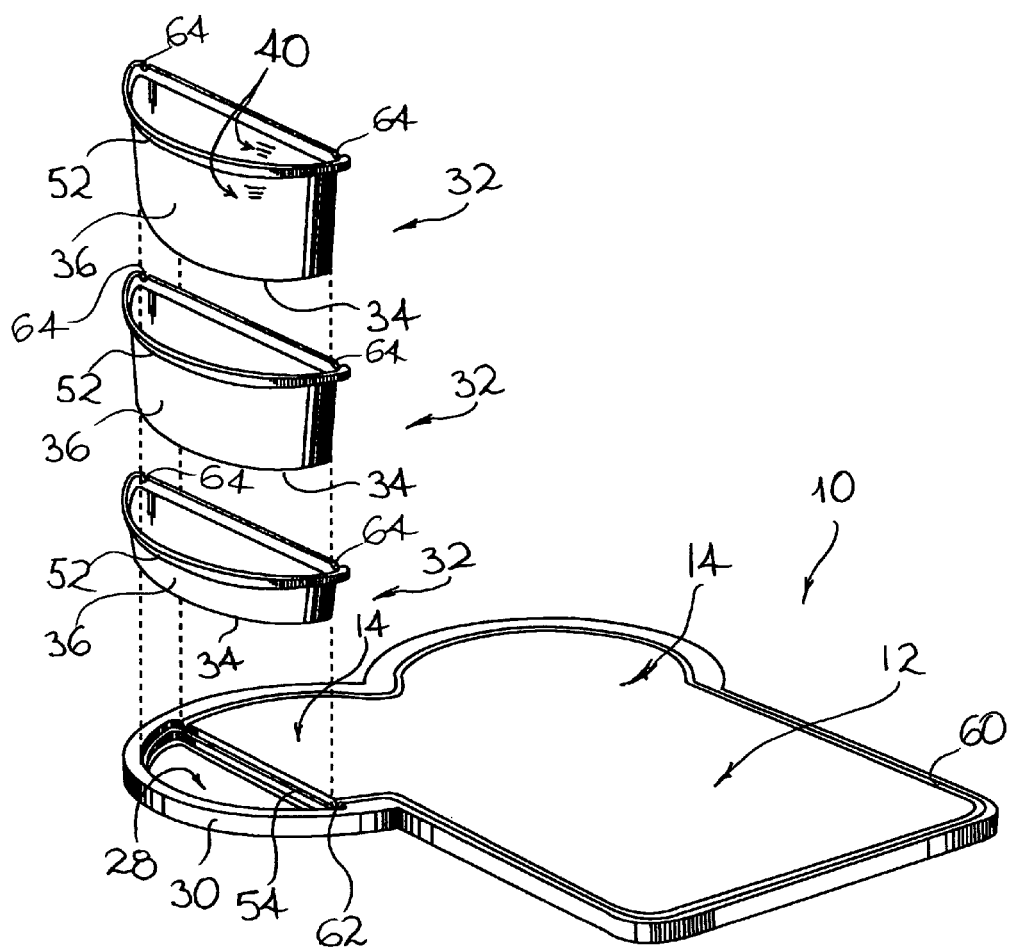
FIG. 4 in a partial exploded view, illustrates a food preparation implement in accordance with an embodiment of the present invention, the implement being shown with open-top containers of various sizes about to be mounted thereto.
Figure 5:
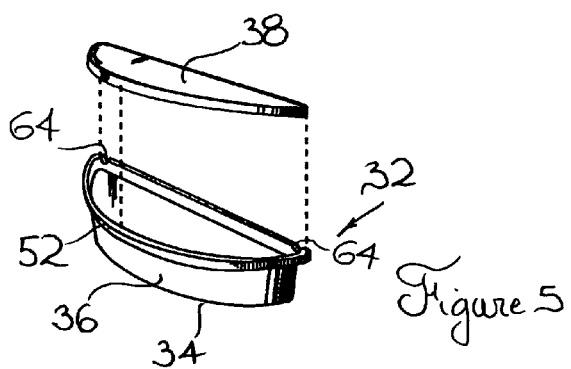
FIG. 5 in a perspective view, illustrates a open-top container part of a food preparation implement in accordance with an embodiment of the present invention, the open-top container being shown with a lid about to be mounted thereon.

As shown more specifically in FIGS. 4 through 9, the implement 10 is typically provided with adaptors or accessories operatively attachable thereto typically adjacent to the discharge aperture 28. As shown in FIGS. 4 and 5, the adaptor may take the form of an open-top container 32 having a container base wall 34 and a container peripheral wall 36 extending from the container base wall. The container 32 is configured and sized so as to allow the foodstuff to be scraped thereinto from the working surface when operatively coupled to the discharge aperture 28.

As shown in FIG. 5, the open-top container 32 may be provided with a cup lid 38 releasably attachable thereto for sealing the corresponding container 32. Optionally, each container 32 may be provided with indicia 40 marked thereon for allowing the corresponding container 32 to act as a measuring cup.

Also, as shown in FIG. 4, the implement 10 is typically provided with at least two and preferably a plurality of containers 32 of different volumes. Each of the open-top containers 32 is configured and sized so as to allow foodstuff to be scraped thereinto from the working surface when operatively coupled to the discharge aperture 28.

Figure 6:
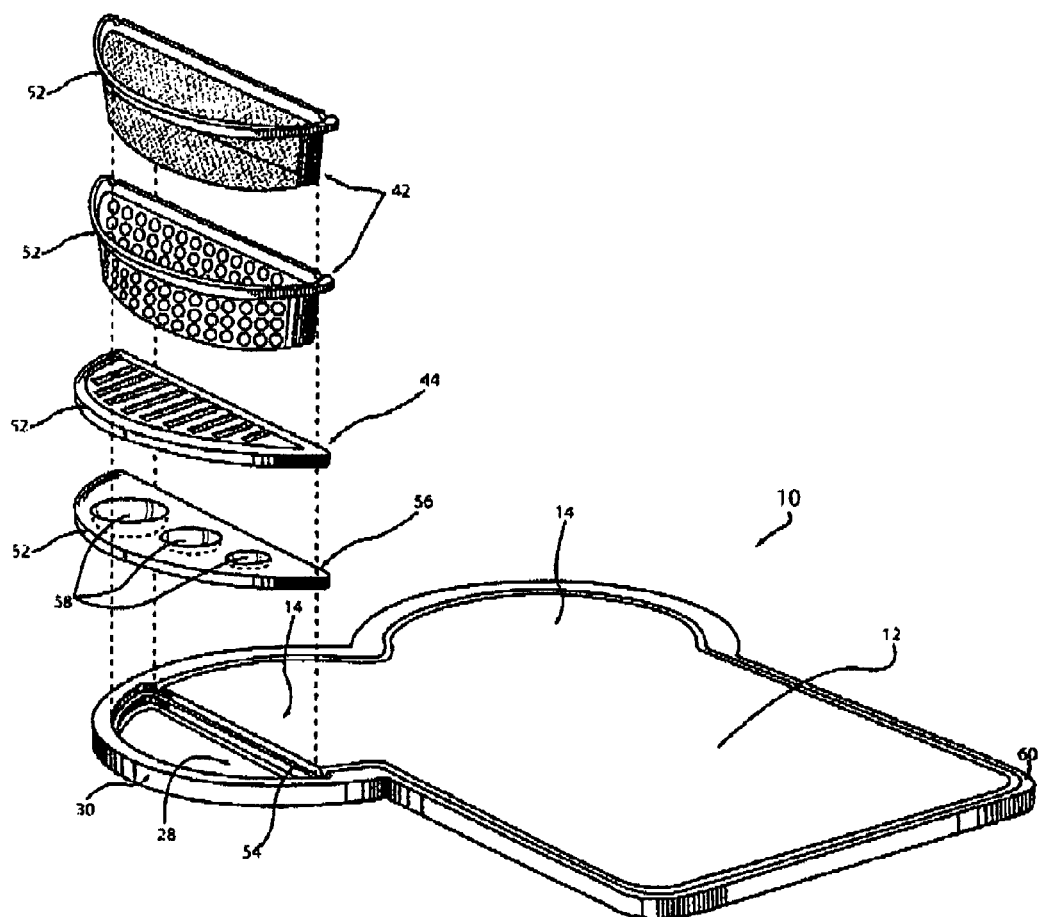
FIG. 6 in a perspective view, illustrates a food preparation implement in accordance with an embodiment of the present invention, the implement being shown with a variety of adaptors about to be mounted thereto.

As illustrated in FIG. 6, the accessory may take the form of a strainer 42 having any suitable type of straining apertures formed therein. Like the containers 32, the strainer 42 is configured and sized so as to allow foodstuff to be scraped thereinto from the working surface when operatively coupled to the discharge aperture 28.

The adaptor or accessory may also take the form of a grater 44 configured and sized so as to allow the foodstuff to be scraped thereonto from the working surface when operatively coupled to the discharge aperture 28.

The adaptor or accessory may further take the form of a measuring component 56. The measuring component 56 includes at least two measuring recesses 58 of predetermined size or volume formed thereinto. The measuring component 56 is configured and sized so as to allow foodstuff to be scraped into any one of the measuring recesses 58 from the working surface when operatively coupled to the discharge aperture 28.

Figure 7:
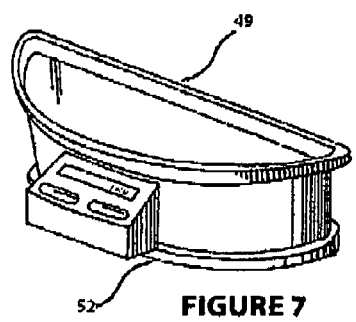
FIG. 7 in a perspective view, illustrates a weight scale part of a food preparation implement in accordance with an embodiment of the present invention.
Figure 8:
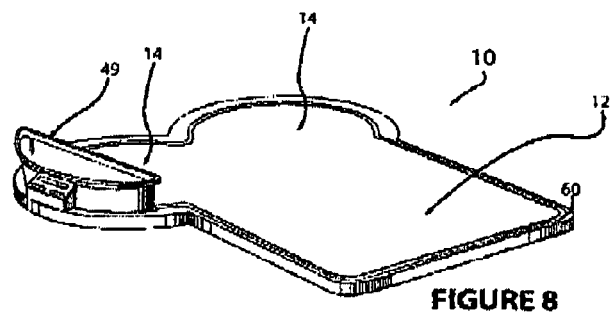
FIG. 8 in a perspective view, illustrates the weight scale shown in FIG. 7 about to be mounted to a food preparation implement both part of a food preparation implement in accordance with an embodiment of the present invention.
Figure 10A:
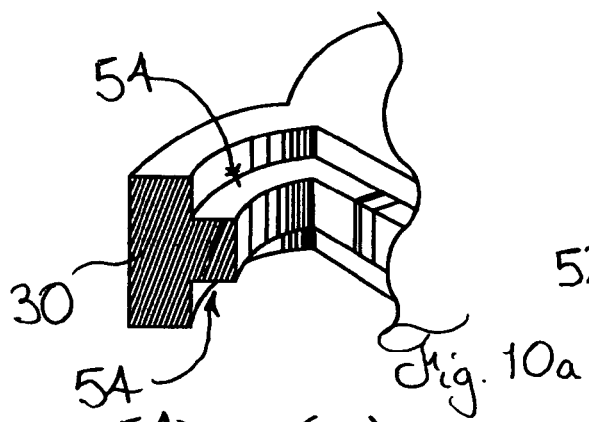
FIG. 10a in a partial cross-sectional view, with sections taken out illustrates the configuration of part of a rim section of a discharge aperture part of a food preparation implement in accordance with an embodiment of the present invention.
Figure 10B:
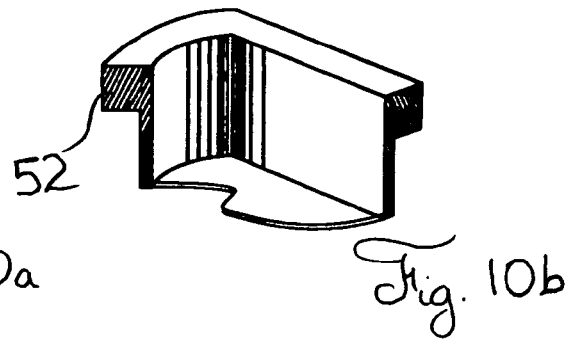
FIG. 10b in a partial cross-sectional view with sections taken out, illustrates the configuration of a corresponding hooking protrusion part of an adaptor also included in an implement in accordance with an embodiment of the present invention.
Figure 11A:
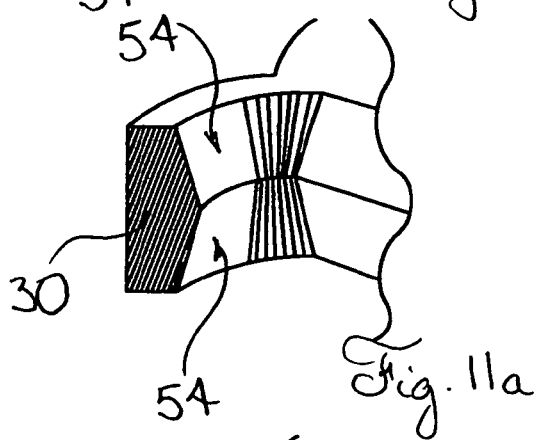
FIG. 11a in a partial cross-sectional view with sections taken out, illustrates a configuration of part of a rim section of a discharge aperture part of a food preparation implement in accordance with an embodiment of the present invention.
Figure 11B:
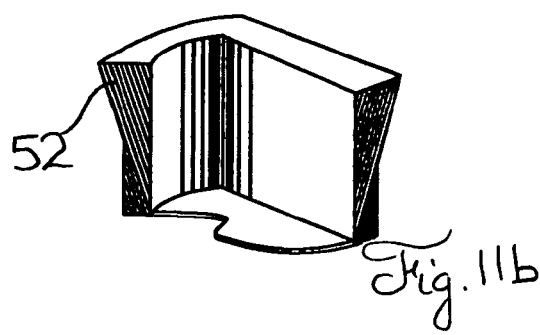
FIG. 11b in a partial cross-sectional view with sections taken out, illustrates the configuration of a corresponding hooking protrusion part of an adaptor also included in an implement in accordance with an embodiment of the present invention.
Figure 12A:
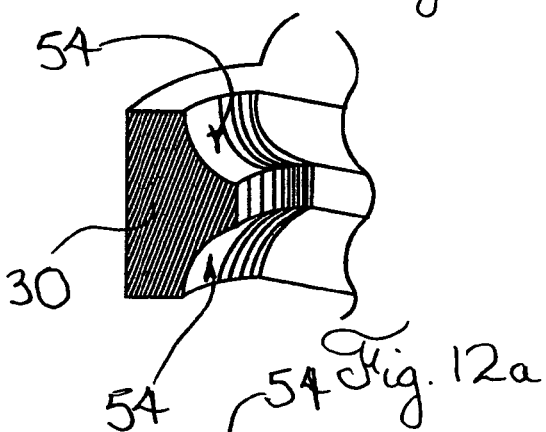
FIG. 12a in a partial cross-sectional view with sections taken out, illustrates a configuration of part of a rim section of a discharge aperture part of a food preparation implement in accordance with an embodiment of the present invention.
Figure 12B:
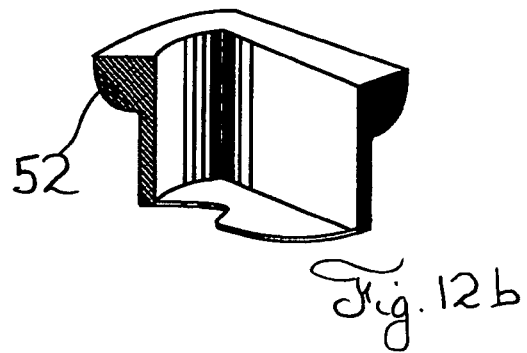
FIG. 12b in a partial cross-sectional view with sections taken out, illustrates the configuration of a corresponding hooking protrusion part of an adaptor also included in an implement in accordance with an embodiment of the present invention.
Figure 13A:
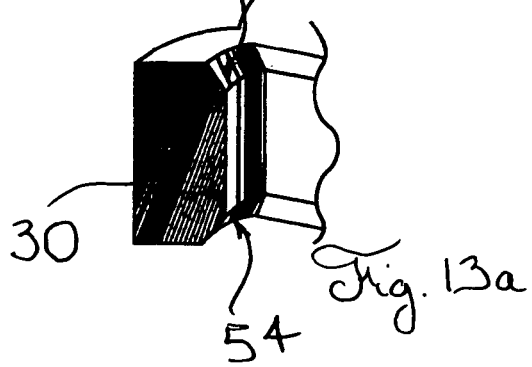
FIG. 13a in a partial cross-sectional view with sections taken out, illustrates a configuration of part of a rim section of a discharge aperture part of a food preparation implement in accordance with an embodiment of the present invention.
Figure 13B:
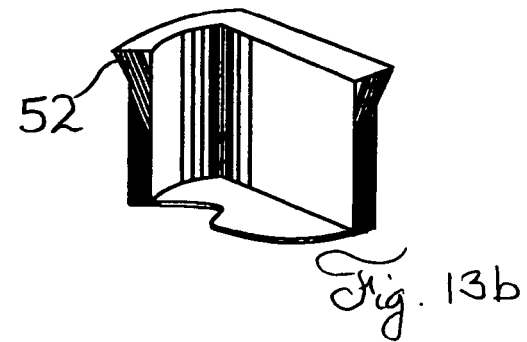
FIG. 13b in a partial cross-sectional view with sections taken out, illustrates the configuration of a corresponding hooking protrusion part of an adaptor also included in an implement in accordance with an embodiment of the present invention.

As illustrated in FIGS. 7 and 8, the adaptor or accessory may take the form of a weighing component 49 such as a weighing scale, balance or the like configured and sized so as to allow foodstuff to be scraped thereonto from the working surface when operatively coupled to the discharge aperture 28.

As illustrated in FIG. 9, the adaptor or accessory may also take the form of a covering component 50 configured and sized so as to cover the discharge aperture 28 and allow the foodstuff to be scraped thereonto from the working surface when operatively coupled to the discharge aperture 28. The covering component 50 is hence typically used for expanding the usable surface of the auxiliary area 14 provided with the discharge aperture 28 when the latter is not needed.

The adaptor or accessory may also take the form of a chute 46 or a funnel 48 both configured and sized for allowing foodstuff to be scraped thereinto from the working surface when operatively coupled to the discharge aperture 28.

Each adaptor is typically provided with a corresponding adaptor releasable attachment means for releasably attaching the corresponding adaptor to the working surface so that the adaptor extends at least partially into the discharge aperture 28. Preferably, the adaptor releasable attachment means allows an upper surface of the adaptor to be substantially co-planar with the working surface when the adaptor is releasably attached to the working surface. The upper surface of the adaptor being substantially co-planar with the working surface, foodstuff may be easily scraped from the working surface into or onto the adaptor as needed.

As illustrated more specifically in FIGS. 10 through 13, in at least some embodiments of the invention, the adaptor releasable attachment means includes a peripheral hooking protrusion 52 extending generally outwardly from the corresponding adaptor. The adaptor releasable attachment means also includes a corresponding peripheral attachment recess 54 formed in the peripheral edge of the discharge aperture 28. The attachment recess 54 is typically configured and sized for substantially mattingly or complimentarily receiving the corresponding hooking protrusion 52 and supporting the latter. In the embodiment shown in FIG. 10b, the hooking protrusion 52 has a substantially rectangular shaped cross-sectional configuration. In the embodiment shown in FIG. 11b, the hooking protrusion 52 has a substantially triangular shaped cross-sectional configuration. In the embodiment shown in FIG. 12b, the hooking protrusion has a substantially sector-shaped cross-sectional configuration whereas in the embodiment shown in 13b, the hooking protrusion has a substantially isocele triangular cross-sectional configuration. The corresponding attachment recesses 54 are substantially accordingly complimentarily shaped relative to the corresponding hooking protrusion 52.

Figure 2:
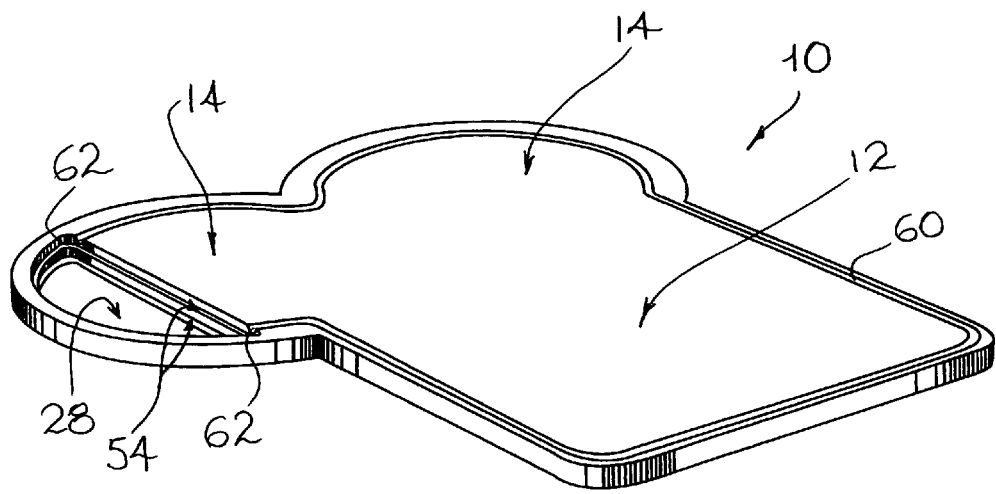
FIG. 2 in a perspective view, illustrates a food preparation implement in accordance with an embodiment of the present invention, the implement being shown with a grooved working surface facing upwardly.
Figure 3:
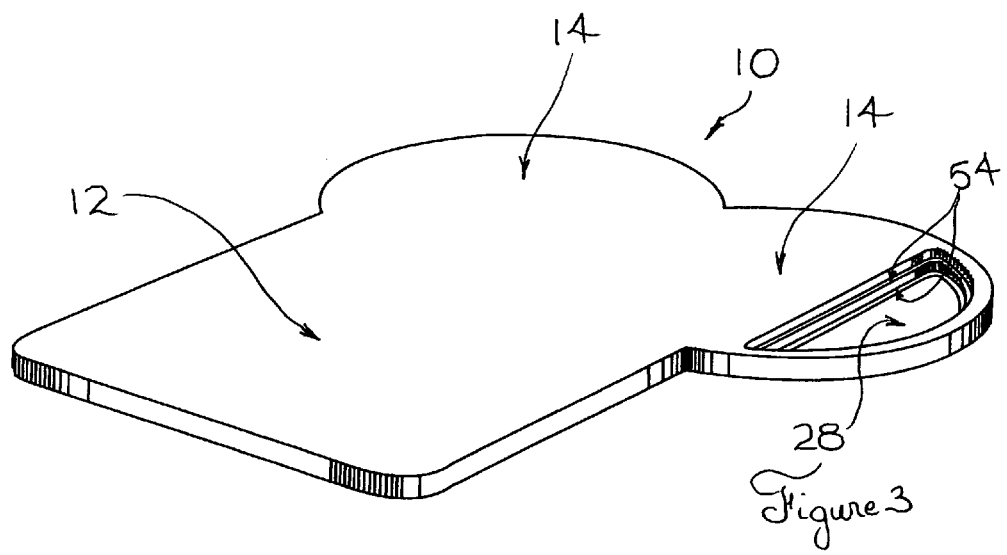
FIG. 3 in a perspective view, illustrates the implement shown in FIGS. 1 and 2 with its flat working surface facing upwardly.

As illustrated more specifically in FIGS. 2 and 3, the implement 10 typically includes a first working surface facing upwardly in FIG. 2 and an opposed second working surface facing upwardly in FIG. 3. The discharge aperture 28 typically extends through the implement 10 between the first and second working surfaces.

The releasable attachment means typically allows the adaptors or accessories to be releasably attached to the implement 10 so as to be usable with either one of the first or second working surfaces. The discharge aperture 28 hence typically includes both a first and a second peripheral attachment recess 54 formed respectively in the first and second working surfaces for each substantially mattingly receiving the hooking protrusion 54 and supporting the latter.

As shown in FIGS. 10a through 13a, the attachment recesses 54 are typically symmetrically disposed relative to a geometrical plane extending between the opposed working surfaces. It should however be understood that the attachment recesses 54 could be otherwise disposed without departing from the scope of the present invention.

As illustrated more specifically in FIG. 2, one of the working surfaces is typically provided with a drainage groove 60 formed thereon for receiving liquids emanating from the corresponding working surface. The drainage groove 60 typically extends substantially adjacent to the peripheral edge of the working surface.

The drainage groove 60 typically defines at least one groove outlet 62 in fluid communication with the discharge aperture 28 for allowing liquids to flow from the drainage groove 60 into the discharge aperture 28. Optionally, the drainage groove 60 is provided with a slanted groove base so as to facilitate gravitational flow of liquids therein towards the discharge aperture 28.

As illustrated more specifically in FIGS. 4 and 5, some of the adaptors or accessories are optionally provided with drainage notches 64 formed therein so as to be substantially in register with the drainage groove outlets 62 when operationally mounted within the discharge aperture 28. Liquids in the drainage groove 60 may hence flow substantially freely into the adaptors such as containers 32 when the latter are operationally mounted to the discharge aperture 28.

The implement 10 typically also includes a spacing means for maintaining its body in a spaced relationship relative to the supporting surface 24. The spacing means is optionally configured so as to further act as a tilting means for tilting at least part of the working surface relative to the supporting surface 24 when the implement 10 is resting on the supporting surface 24.

Typically, the spacing means allows the body to be in a space relationship relative to the supporting surface 24 when the implement is resting on the supporting surface 24 with the first or second working surfaces selectively facing upwardly away from the supporting surface 24. Also, typically, the spacing means further acts as a tilting means for tilting for at least part of the working surface relative to the supporting surface 24 when the implement 10 is resting on the supporting surface 24 with the first or second surfaces selectively facing upwardly away from the supporting surface 24.

As illustrated in FIG. 37, the spacing means may be used for allowing the body to clear an obstacle such as the peripheral rim 94 of the sink 26. The tilting means may be used for tilting the implement body so as to allow liquids on its working surface to flow into the sink 26 through the discharge aperture 28.

The spacing means may take any suitable form. For example, the spacing means may include at least one foot component and typically a set of foot components extending from the body of the implement 10. Optionally, the foot components may be releasably attachable to the body so that both opposed working surfaces may be operationally positioned facing upwardly while the opposed working surface is maintained in a spaced relationship relative to the adjacent supporting surface 24.

FIGS. 17 through 19 illustrate various embodiments of foot components 66, 68, 70 usable as spacing means. It should be understood that other foot component configurations could be used without departing from the scope of the present invention. The foot components 66 through 70 all define a foot attachment segment 72 and an integrally extending foot abuttment segment 74.

The body includes a corresponding set of foot attachment apertures 76 for substantially fittingly receiving a corresponding foot attachment segment 72. Insertion of the foot attachment segment 72 into the foot attachment aperture 76 is typically limited by a limiting segment 78.

FIGS. 20 through 24 illustrate an alternative foot component design. The foot components 80, 81 and 82 all have a substantially C-shaped cross-sectional configuration defining an attachment segment 86 and an abutment segment 88 maintained in a spaced apart and generally parallel relationship relative to each other by a substantially perpendicular spacing segment 90.

The spacing 92 between the attachment and abutment segments 86, 88 is configured and sized for substantially fittingly receiving a segment of the peripheral edge of the implement body. Optionally, as illustrated in FIG. 25, at least part of the implement body may be provided with an attachment flange 84 protruding therefrom for facilitating attachment thereto of correspondingly shaped foot components 80 or 82. In another embodiment of the invention shown in FIGS. 29 and 31 the implement body is provided with attachment recesses 85 formed adjacent its peripheral edge for facilitating attachment thereto of correspondingly shaped foot components.

FIGS. 22 and 23 illustrate an embodiment of the invention wherein the spacing 92 is angled longitudinally so as to act as a longitudinal tilting means. FIG. 24 illustrates an embodiment wherein the spacing 92 is angled transversally so as to also act as a transversal tilting means.

FIGS. 14 and 15 illustrate yet another alternative embodiment of the present invention wherein the spacing means includes a foot strip 96 having an abutment component 98 extending substantially upwardly therefrom adjacent longitudinal ends thereof. The foot strip 96 is configured and sized so as to be positionable between the supporting surface 24 and the body of the implement 10 with the abutment components 98 positioned outwardly and substantially adjacent to the peripheral edge of the body.

FIGS. 32 through 34 illustrate yet still another alternative embodiment of the present invention wherein the spacing means includes a foot strip 99 having a substantially "L"-shaped cross-sectional configuration. The foot strip 99 is configured and sized for substantially fittingly receiving the peripheral edge of the implement body.

The foot components 66, 68, 70, 80, 82, 96 and 99 are typically formed out of a generally resilient material having a substantially high friction co-efficient such as a suitable elastomeric resin.

I claim:

1. An implement for supporting foodstuff and allowing food preparation operations to be performed thereon, said implement being mountable over a supporting surface, said implement comprising:
a body having a substantially planar working surface, said working surface including a main area and at least one auxiliary area, said main and auxiliary areas being substantially coplanar and extending continuously from each other, said main and auxilary areas respectively defining a main area peripheral edge and an auxiliary area peripheral edge; said main and auxiliary area peripheral edges having distinct geometrical configurations for facilitating the visual identification and recognition thereof; said main and auxiliary areas extending from each other along a shared edge portion of said main and auxiliary areas peripheral edges; said working surface area being substantially planar substantially adjacent and across said shared edge portion; whereby said main and auxiliary areas are adapted to be used for distinct food preparation operations and said continuous relationship between said main and auxiliary areas and said substantially planar configuration of said working surface substantially adjacent and across said shared edge portion facilitate scraping said foodstuff between said main and auxiliary areas.

2. An implement as recited in claim 1 wherein at least part of said auxiliary area forms a protruding portion protruding outwardly from an adjacent portion of said main area peripheral edge.

3. An implement as recited in claim 2 wherein said main area and said protruding portion are configured and sized so that said implement is stably supported when said main area is rested on said supporting surface with said protruding portion extending away from said supporting surface; whereby said protruding portion is stably positionable over an open area.

4. An implement as recited in claim 2 wherein said protruding portion includes a discharge aperture extending therethrough; whereby said foodstuff may fall through said discharge aperture when said foodstuff is scrapped into said discharge aperture.

5. An implement as recited in claim 1 wherein said main area peripheral edge includes at least one substantially rectilinear edge segment and wherein said auxiliary area peripheral edge includes an arcuate edge segment.

6. An implement as recited in claim 5 wherein said main area has a substantially rectangular configuration and wherein said auxiliary area has a substantially truncated disc-shaped configuration.

7. An implement as recited in claim 6 wherein said main area peripheral edge includes a substantially rectilinear end edge and a pair of opposed and substantially rectilinear lateral edges extending substantially perpendicularly from said end edge; said auxiliary area peripheral edge including an arc segment, said arc segment intercepting one of said lateral edges.

8. An implement as recited in claim 1 wherein said working surface is provided with a discharge aperture extending therethrough, said discharge aperture being configured, sized and positioned to allow said foodstuff to be scraped therein from said working surface.

9. An implement as recited in claim 8 wherein said discharge aperture extends through said auxiliary area.

10. An implement as recited in claim 9 wherein said discharge aperture is positioned substantially adjacent to said auxiliary area peripheral edge.

11. An implement as recited in claim 10 wherein said auxiliary area peripheral edge includes an auxiliary area arcuate edge segment; said discharge aperture detaining a discharge aperture peripheral edge, said discharge aperture peripheral edge including a substantially arcuate aperture arced edge segment, said aperture arced edge segment being substantially in register with said auxiliary area arcuate edge segment so as to define a substantially arcuate rim therebetween; said rim being configured and sized to be usable as a handle.

12. An implement as recited in claim 11 wherein said discharge aperture has a substantially "D"-shaped configuration.

13. An implement as recited in claim 1 further comprising at least one foot extending substantially outwardly from said body for supporting said implement on said supporting surface, said at least one foot being releasably attachable to said body.

14. An implement as recited in claim 13 comprising both a first working surface and an opposed second working surface; said at least one foot being releasably attachable to said body so as to alternatively extend from both said first and second working surfaces.

15. An implement as recited in claim 1, where said auxiliary area is provided with a discharge aperture extending therethrough, said implement further comprising a covering component operatively attachable to said discharge aperture, said covering component being configured and sized so as to cover said discharge aperture and allow said foodstuff to be scraped thereunto from said working surface when operatively attached to said discharge aperture.

16. An implement as recited in claim 1, wherein said auxiliary area is provided with a discharge aperture extending therethrough, said implement being provided with an adaptor operatively attachable to said discharge aperture, said adaptor being provided with an adaptor releasable attachment means for releasably attaching said adaptor to said working surface so that said adaptor extends at least partially into said discharge aperture, said adaptor releasable attachment means allowing an upper surface of said adaptor to be substantially coplanar with said working surface when said adaptor is releasably attached to said working surface.

17. An implement as recited in claim 16 comprising both a first working surface and an opposed second working surface; said discharge aperture extending between said first and second working surfaces; said adaptor releasable attachment means allowing said adaptor to be releasably attached to said implement so as to be usable with either one of said first or second working surfaces.

18. An implement as recited in claim 15 comprising both a first working surface and an opposed second working surface; said discharge aperture extending between said first and second working surfaces; said covering component being operatively attachable to said implement so as to be usable with either one of said first or second working surfaces.

* * * * *